United States Patent [19]
Kester

[11] Patent Number: 6,031,178
[45] Date of Patent: Feb. 29, 2000

[54] SYSTEM TO LINK THE KINEMATICS OF NEIGHBORING PANELS IN A PANEL ASSEMBLY

[75] Inventor: Gerardus Joseph Adrianus Nicolaas Kester, Vinkeveen, Netherlands

[73] Assignee: Fokker Space B.V., Leiden, Netherlands

[21] Appl. No.: 09/074,383

[22] Filed: May 8, 1998

[30] Foreign Application Priority Data

Mar. 26, 1998 [EP] European Pat. Off. .............. 98200951

[51] Int. Cl.⁷ .............................. H01L 31/045; E05F 1/08
[52] U.S. Cl. .............................. 136/245; 136/292; 16/75; 160/135; 160/234; 160/152
[58] Field of Search ...................... 136/245, 292; 126/624, 627; 160/115, 153, 154, 156, 159, 135, 152, 234, 199, 206; 236/34; 248/475.1, 479; 16/75

[56] References Cited

U.S. PATENT DOCUMENTS

| | | |
|---|---|---|
| 3,460,992 | 8/1969 | Avilov et al. ............................ 136/89 |
| 4,155,524 | 5/1979 | Marello et al. .......................... 244/173 |
| 5,131,955 | 7/1992 | Stern et al. .............................. 136/245 |
| 5,319,905 | 6/1994 | Szirtes ........................................ 52/108 |
| 5,520,747 | 5/1996 | Marks ...................................... 136/245 |
| 5,785,280 | 7/1998 | Baghdasarian .......................... 244/173 |
| 5,885,367 | 3/1999 | Brown et al. ............................ 136/245 |

*Primary Examiner*—Nam Nguyen
*Assistant Examiner*—Michael C. Miggins
*Attorney, Agent, or Firm*—Young & Thompson

[57] ABSTRACT

A panel assembly includes a number of rectangular panels each carrying solar cells or a cooling radiator on one of the two main surfaces, where the panels are interconnected mutually by hinges such that the assembly from a first state, in which the panels are folded into a package, can be brought into a second state in which the package is unfolded and the panels are situated alongside each other. A torsion element substantially extends across the other main surface of each panel from a first position on the hinge axis between the panel and the adjoining panel at one side, to a second position on the hinge axis between the panel and the adjoining panel at the other side, whereby the torsion element at or near the first and second positions is attached to the respective adjoining panel.

18 Claims, 2 Drawing Sheets

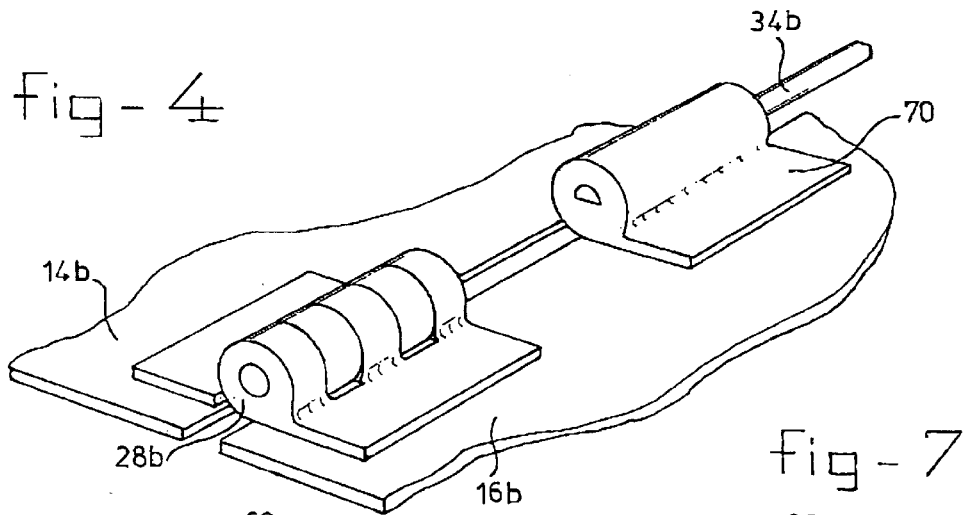
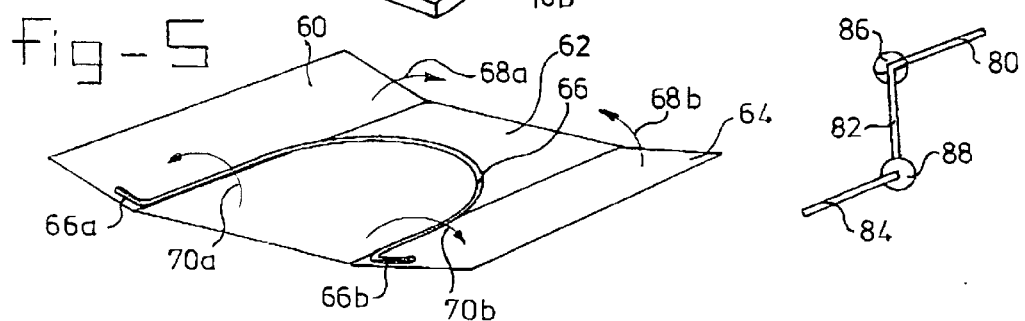
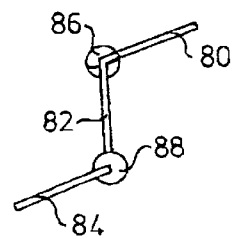
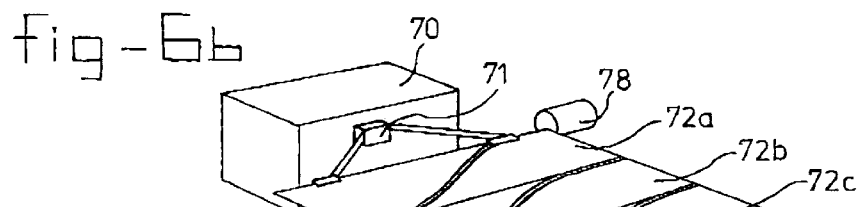
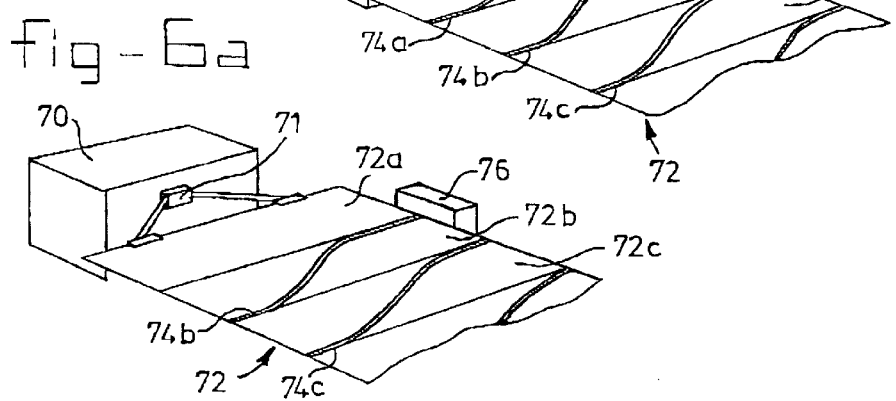

SYSTEM TO LINK THE KINEMATICS OF NEIGHBORING PANELS IN A PANEL ASSEMBLY

BACKGROUND OF THE INVENTION

1. Field of the Invention

The invention relates to a panel assembly comprising a number of rectangular flat panels interconnected mutually by hinges such that the assembly from a first state, in which the panels are folded upon each other into a package, can be brought into a second state in which the panels are situated alongside each other.

2. Description of the Related Art

Such panel assemblies whereby at least some panels carry solar cells are already known, e.g. from U.S. Pat. Nos. 5,487,791 and 5,509,747. In the first state the panels of these assemblies are folded zigzag wise into a package and in the second state the panels are unfolded and are oriented alongside each other in the same plane, forming one larger solar panel assembly.

Instead of solar cells any other suitable devices could be connected to the panels such as one or more cooling radiators, a number of mirrors, etc. In fact it is not even necessary that other components are attached to the panels. The panels as such can be used for instance for reflecting electromagnetic energy such as radio or radar waves.

Other known assemblies are described in U.S. Pat. No. 5,520,747 and EP 0754626. Wherein a central panel is adjoined by two side panels which in the first state both are folded just as window shutters on top of the same surface of the central panel and in the second state are unfolded and oriented along the central panel under a predetermined angle. In the unfolded state the mirrors, carried by the side panels will reflect sun light on the solar cells carried by the central panel.

In fact U.S. Pat. No. 5,520,747 describes a combined assembly whereby all central panels are unfolded zigzag-wise whereafter the side panels connected to each central panel are unfolded window shutter wise.

Before transport the panels of such a panel assembly are folded into a package of which the length and width correspond approximately with the length and width of one separate panel and of which the thickness corresponds approximately with the thickness of one panel multiplied by the number of panels thereby greatly reducing the volume occupied by the assembly. In this state the assembly is transported from the earth into an orbit in space. In general the transporting vehicle (rocket, space shuttle, etc.) is able to transport payloads of rather restricted dimensions and restricted weight. Therefore, it is required in general that solar panel assemblies have a low weight and dimensions which should be within certain limits. To maintain a low weight one could use stiffness-efficient constructions having a sufficient strength, such as constructions comprising a lot of air and still having a sufficient stiffness and strongness, such as for instance honeycomb sandwich panels.

In general the only way to reduce the dimensions of a solar panel assembly in its first state is to reduce the thickness of the actual panels. In case honeycomb sandwich constructions are used the only reduction possibility is to reduce the dimensions of the core. The surface, i.e. the length and width of each panel, will be selected as large as possible to obtain a large useful area for locating solar cells.

A too great a reduction of the weight may lead to a construction having too little stiffness, both in a stowed configuration and in the fully deployed configuration. During operation, that may lead to harmful bending and torsion movements or oscillating movements of the individual panels or of the assembly as a whole in its extended second state. Such movements may occur for instance in the situation in which the position of the assembly in relation to the carrying satellite has to be corrected.

Structural stiffness can be given to an extended solar panel assembly of relatively thin rectangular panels by curving each panel in a direction parallel to the panel edges to which the hinges between the panels are not attached. Such an embodiment is described in an older European application 97204099.2 in the name of Fokker Space.

Among systems to link the kinematics of neighboring panels of the solar panel assembly during unfolding from an undeployed position to a deployed position are systems employing motors, powered reels comprising cables, pulleys or the like. Examples of systems to synchronize the angular rotation of all the panels of he solar panel assembly during unfolding are those presented by U.S. Pat. Nos. 5,487,791 and 5,509,747.

In the first mentioned U.S. Pat. No. 5,487,791 a system is described which comprises in fact two of the above-mentioned assemblies which in the unfolded second state are positioned in the same plane alongside each other. Each panel of the first assembly is connected through a pivot hinge to an adjacent panel of the second assembly. These pivot hinges extend along the central line of the respective panels such that both assemblies can be unfolded from the first into the second state simultaneously, whereby the unfolding operation of the first assembly takes place in counterphase in relation to the unfolding operation of the second assembly. Especially because of the presence of the pivot hinges it is impossible to get the panels in one plane and consequently curving of the panels to provide structural stiffness to the panel assembly as a whole cannot be used.

The assembly described in U.S. Pat. No. 5,509,747 comprises an articulation arrangement whereby all hinge axes are mutually coupled by means of gear wheels, wire wheels and a number of endless wires running across pairs of wire wheels such that an unfolding movement between for instance the first two panels in the assembly is transferred to all the other hinges which will move simultaneously in the same way and in the same direction. Miniaturization of the control mechanisms will undoubtedly lead to very high mechanical stresses in the various sprocket wheels or chain wheels.

SUMMARY OF THE INVENTION

Considering these prior art configurations as either complicated or unreliable, an object of the invention was to provide a rather simple configuration specially designed for operating a panel assembly wherein the panels are relatively thin.

In agreement with this object, the invention provides a solar panel assembly of the type mentioned in the first paragraph which is characterized in that a torsion element extends across at least one of the panels from a first position on the hinge line between the respective panel and the adjoining panel at one side to a second position on the hinge line between the respective panel and the adjoining panel at the other side whereby the torsion element at or near said first and second positions is attached to the respective adjoining panel.

In fact the only additional element which has to be present between the pile of panels in the folded first state are the various torsion elements. These torsion elements in general are embodied as an elongated tube, rod or wire made of a resilient material, which is preferably flexible in bending and torsionally stiff, and which has a small diameter. In most cases the thickness of the whole package will be determined mainly by the thickness of the panels themselves as well as the dimensions of the various hinges. In general the dimensions of the torsion elements have no influence on the thickness of the whole panel.

In a specific embodiment the assembly comprises three panels of which the two outer panels in the said first state are positioned on top of the same surface of the middle panel, whereby the torsion element has an inverted U-shape. In this embodiment the panels are folded and unfolded just as window shutters.

In another embodiment the assembly comprises three or more panels which, in the first state, are folded zigzag wise, whereby each torsion element has an S-shape. In this embodiment the panels are folded and unfolded zigzag wise.

In a preferred embodiment a panel assembly is characterized in that at said first and second position the torsion element is shaped as an axle and functions as hinge axle for one of said parallel hinges. Therewith it is guaranteed that the torsion element extends indeed from a first position on the hinge axis between the panel and the adjoining panel at one side to a second position on the hinge axis between the panel and the adjoining panel at the other side.

BRIEF DESCRIPTION OF THE DRAWINGS

FIG. 4 illustrates an alternative embodiment of a fastener for attaching one of the torsion rods to one of the panels.

FIG. 5 illustrates an embodiment with an inverted U-shaped torsion element.

FIG. 6 illustrates two embodiments of a panel assembly according to the invention with two different means for folding/unfolding these assemblies.

DETAILED DESCRIPTION OF THE INVENTION

FIG. 7 illustrates an alternative for the torsion element.

Figure 1:
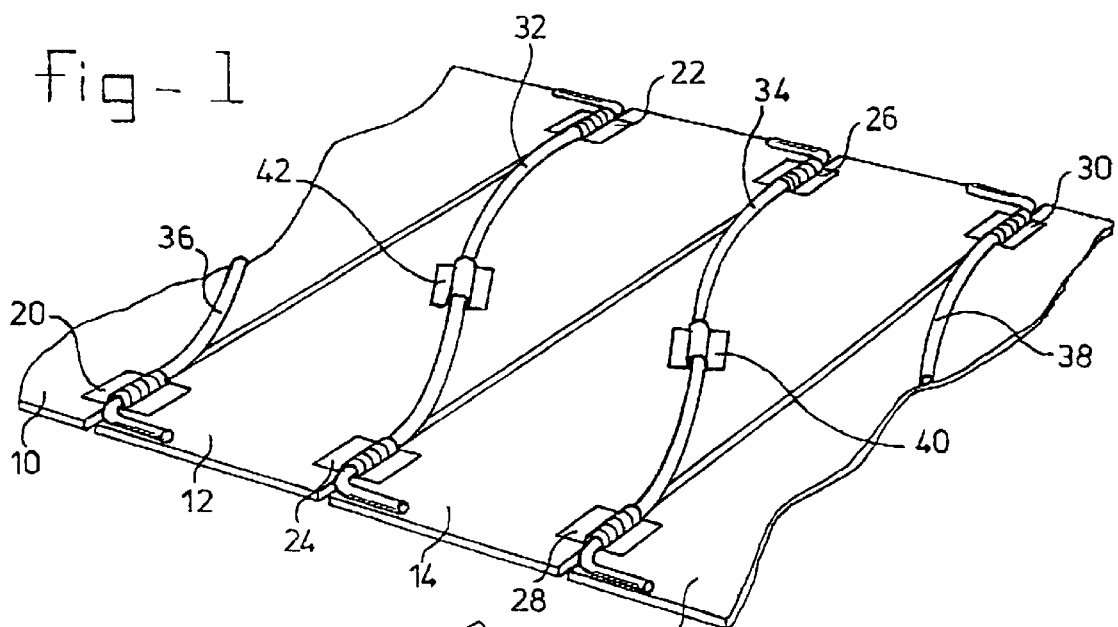
FIG. 1 illustrates a perspective view of a panel assembly according to the invention in the unfolded second state.

In FIG. 1 four separate panels are visible, i.e. the panels 10, 12, 14, and 16. The panels are interconnected by means of hinges. Especially the panels 10 and 12 are interconnected by the hinges 20 and 22, the panels 12 and 14 are interconnected by means of the hinges 24 and 26, the panels 14 and 16 are interconnected by means of the hinges 28 and 30. A flexible torsion rod extends across each of the panels and the ends thereof are positioned in the central hinge passage such that these torsion rod ends function as hinge pins. The torsion rod 32 extends across the panel 12 and, as is clearly illustrated in FIG. 1, the upper end thereof is inserted in the hinge 22 whereas the lower end thereof is inserted in the hinge 24. The torsion rod 34 extends across the panel 14, the upper end thereof is inserted in the central passage of the hinge 26 whereas the lower end of the torsion rod 34 is inserted in the central passage of the hinge 28. In the same manner the torsion rods 36 and 38, which are only partly visible in the figure, are installed on their panels 10 and 16 respectively. The upper end of torsion rod 32 extending outside the hinge 22 is bent parallel to the panel 10 and attached to said panel. The lower end of the torsion rod 32 is also bent parallel to the panel 14 and attached to said panel 14. The way in which the bent ends are attached to the respective panels is not relevant. One could use separate mounting means such as bolt and nuts or other appropriate fastener or one could rely on for instance a welded or soldered connection. In the same way the ends of the other torsion rods 34, 36, and 38 are bent and fastened to the surface of the adjoining panel.

It is assumed in FIG. 1 that the solar cells of the solar panel assembly are mounted at the not visible underside of the various panels.

To avoid vibrations in the rather resilient torsion rods it is preferred to use one or more intermediate saddle-shaped fasteners 40, 42 to guide the rods at various intermediate places. In FIG. 1 one of such fasteners for each torsion rod is illustrated, however, it will be clear that more of such guiding fasteners could be used if necessary.

During transport from the earth into space the panels are folded zigzagwise together into a package, which is indicated as the first state of the assembly. After reaching its position in space the panels are unfolded until they reach a situation in which all panels are positioned in one plane as is illustrated in FIG. 1.

Figure 2:
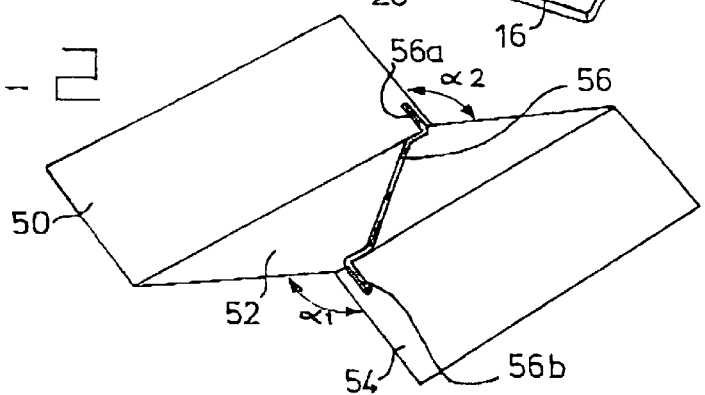
FIG. 2 illustrates a schematic view for explaining the functioning of the various torsion rods.

FIG. 2 illustrates an intermediate situation of the unfolding process. In the following, the functioning of the torsion rods will be discussed with reference to FIG. 2.

In FIG. 2 only three panels are illustrated indicated by 50, 52, and 54. Furthermore, only one of the torsion elements is illustrated indicated by 56. The upper bent end of torsion element 56 is indicated by 56a and the lower bent end of torsion element 56 is indicated by 56b. Just as explained with reference to FIG. 1 the end 56a is attached to panel 50 and the end 56b is attached to panel 54. The various hinges interconnecting the panels 50, 52, and 54 are not illustrated because they do not play a role in the functional explanation of the torsion elements. It is only important that the torsion element 56 extends through the hinge line as is illustrated in FIG. 1.

It is assumed that the bent ends 56a and 56b are in parallel planes. In the illustrated situation in FIG. 2 the angle between the panels 52 and 54 is indicated by $\alpha 1$ and the angle between the panels 50 and 52 is indicated by $\alpha 2$. An important property of the torsion element is that it strives to a condition whereby the bent ends 56a and 56b are still in parallel planes. That implies that if the panels 52 and 54, by (not illustrated) actuating means, are moved in the unfolding direction such that the angle $\alpha 1$ is increasing, then, because of the mentioned property of the torsion rod 56, the bent end 56a thereof will act on the panel 50 such that the angle $\alpha 2$ between the panels 50 and 52 is also increasing. Because all adjoining panels each have their own torsion rod and because in fact all the bent end sections thereof are extending parallel, the combined action of all these torsion rods will result into an unfolding movement of the whole assembly when only two adjacent panels thereof are moved in the unfolding direction.

The same applies for bringing the assembly back from the unfolded second state into the folded first state. By moving the panels 52 and 54 by means of suitable actuators such that the intermediate angle $\alpha 1$ will decrease, the panel 50 will also start moving such that the angle $\alpha 2$ will decrease under the influence of the torsion rod 56. The combined action of all the various torsion rods will lead to a situation whereby the whole panel will fold together only by moving the panels 52 and 54 towards each other.

In FIGS. 1 and 2 the ends of the torsion wires are bent at an angle of about 90°. This is preferred to obtain a long effective force transmitting arm. However, smaller angles with resultant smaller effective force transmitting arms are certainly within the scope of the invention.

Figure 3:
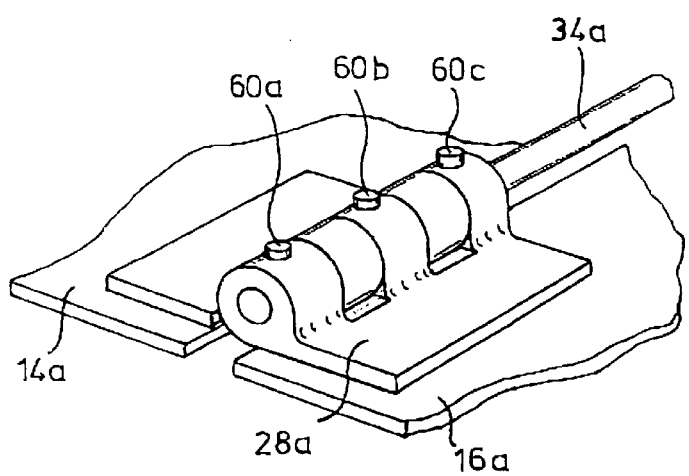
FIG. 3 illustrates another embodiment of a hinge used for interconnecting the various panels of the assembly.

FIG. 3 illustrates an alternative embodiment of a hinge 28a between the panels 14a and 16a. The end of the torsion rod 34a is attached to the panel 16a by attaching it to those parts of the hinge 28a which are connected to the panel 16a. In FIG. 3 small bolts 60a, 60b, 60c are used to fix the end of the torsion rod 34a to the section of the hinge 28a which is connected to the panel 16a. The way in which the hinge is connected to the panel is not illustrated because it does not play a role in relation to the invention.

A further alternative embodiment is illustrated in FIG. 4. In this figure the end of the torsion rod 34b is not extending through the central passage of the hinge 28b, acting thereby as hinge pin, but is fastened by means of a bracket 70 to the panel 16b. The bracket 70 is constructed such that the end of the torsion rod 34b is preferably aligned with the central axis of the hinge 28b. The bracket 70 could have a section with a central passage in which the end of the torsion rod 34b could be inserted and could be fixed by means of bolts in a similar manner as is illustrated in FIG. 2. In FIG. 4 another solution is illustrated. The end section of the round torsion element 34b is flattened such that locally only half the volume of the original round rod remains. The central passage through the fastener 70 has a corresponding shape and the torsion rod 34 is fixed to the panel 16b by inserting its end into the passage in the fastener 70.

FIG. 5 illustrates an embodiment in which, in stead of an S-shaped torsion element as in FIGS. 1–4, an inverted U-shaped torsion element is used. The assembly comprises in this case only three panels 60, 62 and 64. The panels are interconnected by parallel hinges which are not separately illustrated in FIG. 5. An inverted U-shaped torsion rod 66 extend across the middle panel 62. Both bent ends 66a and 66b of the torsion rod 66 are attached to the respective adjoining panels in a suitable manner.

It is assumed that the solar cells are attached to the non visible underside of the middle panel 62 and that mirrors are attached to the non visible underside of the panels 60 and 64.

If the side panel 60 is rotated along its hinge line in the direction indicated by the arrow 68a, then because of the influence of the torsion element 66 the other outer panel 64 will rotate in counterdirection indicated by arrow 68b. To obtain the first state this folding operation is continued until both outer panels 60 and 64 are on top of the panel 62. Dependent on the dimensions the outer panels are in this first state alongside each other or (partly) on top of each other, which is completely unimportant for the invention.

From the first state the assembly reaches its second state by rotating one of the outer panels, e.g panel 60 in the direction indicated by the arrow 70a. The other outer panel 64 will rotate in the direction of the arrow 70b under the influence of the torsion element 66. The panels pass a situation in which all three panels are in the same plane and both outer panels will rotate further until a predetermined angle with the middle pane is obtained in which situation sun light impinging in the figure on the (not visible) under surfaces will be reflected from the outer panels onto the middle panel.

In all the illustrated embodiments the various hinges have mutually parallel hinge lines. That is, however, not a prerequisite. If in a zigzag configuration of panels the various hinge lines in the series determine a small mutual angle then, after unfolding the assembly, the various panels will determine a fan-shaped surface. With suitable dimensions it is even possible to obtain a C-shaped surface or even a completely closed ring-shaped surface.

In the above described embodiments it was furthermore assumed that the panels were used for carrying solar cells or mirrors. That is, however, not a prerequisite. The unfolded panels can be used also for reflecting for instance electromagnetic waves such as radio waves or radar waves onto an antenna. If the panels as such are made of a reflecting material then no further components have to be attached to obtain the desired goal.

If the panels as such are made of a light reflecting material, such as highly polished aluminium or another suitable material, then special panel assemblies which define a large surface in the unfolded second state could be used to reflect solar light to one specific light receiver in space or even on the earth.

To illustrate schematically the means for driving a panel from the first state into the second state two embodiments of an unfolded panel, attached to a satellite, are illustrated in FIGS. 6a and 6b. In FIG. 6a the panel assembly, as a whole indicated by 72, comprises the panels 72a, 72b, 72c, . . . , each by means of hinges connected to each other in the above described manner. Torsion elements 74b, 74c extend across the panels 72b, 72c, . . . , but not across panel 72a (and also not across the outer panel at the other end of the series). The panel assembly 72 is through a boom 71 attached to the body of the satellite 70. Details about the boom 71 and the satellite 70 will not be provided because they are not relevant in relation to the invention.

A drive motor 76 is attached to the free sides of the panels 72a and 72b as is schematically illustrated in FIG. 6a. The function of the drive motor is to rotate the panel 72b in relation to panel 72a along the hinge line between both panels. If the panel assembly is in its first state whereby all panels are zigzagwise folded together and are positioned on top of each other, and the drive motor 76 is activated then panel 72b starts to rotate away from panel 72a. Because of the influence of all the various torsion rods 74a, 74b, etc., all the other panels start to rotate along their various hinge lines as is described above and the panel as a whole will start defolding until the desired end situation is obtained.

Another way of driving the package from the folded first state into the unfolded second state is illustrated in FIG. 6b. In this figure the same components 70, 71, 72, 72a, 72b, 72c, . . . , and 74a, 74b, . . . , are illustrated. In this figure there is a further tension rod extending across panel 72a. The end of this torsion rod 74a positioned on the hinge line between panels 72a and 72b is attached as described above. The other end is attached to the shaft of a drive motor 78. The house of said drive motor 73 is attached to the panel 72a. By rotating the shaft of the drive motor 78 a rotational force will act on the attached end of the torsional shaft, which rotational force will be transmitted to the other end with the result that the panels 72a and 72b will start folding or defolding (dependent on the rotational direction of the drive motor 78). It will be clear that, because of the influence of the further torsion elements, the whole panel assembly will start folding or defolding.

In all the above illustrated and discussed embodiments it was assumed that the torsion element consists of a tube, wire or rod of a resilient and torsionstiff material. However, instead of such a rod also a combination of stiff and non-resilient rods, interconnected by means of homokinetic couplings can be used. Such a combination is schematically illustrated in FIG. 7. Therein three stiff and unbendable rods 80, 82, and 84 are illustrated interconnected by two homokinetic couplings 86 and 88. As such the homokinetic coupling is considered as generally known and no further details thereof will be provided. A combination as illustrated in FIG. 7 will fulfill the same function as a flexible and torsionally stiff tension rod, tube or wire as assumed in the previous figures.

I claim:

1. An expanding panel assembly comprising:

a plurality of panels hingedly connected by a plurality of hinges, the panel assembly being moveable between a first state and a second state, said first state having said plurality of panels folded upon each other in a stacked arrangement, said second state having said plurality of panels situated adjacently edgewise in side-by-side fashion; and a plurality of elongated S-shaped torsional springs, each of said plurality of elongated torsional springs extending diagonally across a first face of an associated one of said plurality of panels, each of said plurality of elongated torsional springs being attached at a first position to a first adjoining panel at a first hinge line between an edge of said associated one of said plurality of panels and an edge of said first adjoining panel, each of said elongated torsional springs being attached at a second position on a second adjoining panel at a second hinge line between an opposite edge of said associated one of said plurality of panels and an edge of said second adjoining panel;

wherein the panel assembly is designed and constructed to be cooperatively moved between said first state and said second state upon movement of one of said plurality of panels with respect to an adjacent one of said panels.

2. The expanding panel assembly of claim 1, wherein said first state has said plurality of panels folded upon each other in a zigzag-wise stacked arrangement.

3. The expanding panel assembly of claim 1, wherein said plurality of elongated torsional springs comprises a resilient material in the form of one of an elongated tube, an elongated rod, and an elongated wire.

4. The expanding panel assembly of claim 1, wherein said plurality of elongated torsional springs comprises at least one of a rod, a tube, and a wire interconnected by a plurality of homokinetic coupling elements.

5. The expanding panel assembly of claim 1, further comprising at least one guiding element attached to said first face, wherein said at least one guiding element constrains an associated one of said plurality of elongated torsional springs from transverse movement along said first face.

6. The expanding panel assembly of claim 1, wherein axes of rotation of said plurality of hinges are aligned so as to be mutually parallel.

7. The expanding panel assembly of claim 1, wherein a second face, opposite said first face, of at least one of said plurality of panels comprises one of a solar cell, a cooling radiator, and a mirror attached thereupon.

8. The expanding panel assembly of claim 1, wherein a second face, opposite said first face, of at least one of said plurality of panels is designed and constructed to reflect radio frequency electromagnetic energy.

9. The expanding panel assembly of claim 1, wherein each of said plurality of elongated torsional springs further comprises a first angled end section at a first end attached at said first position to said first adjoining panel, and a second angled end section at a second end attached at said second position to said second adjoining panel.

10. The expanding panel assembly of claim 9, wherein the angle of said first angled end section and said second angled end section with respect to an associated hinge line is approximately 90 degrees.

11. The expanding panel assembly of claim 1, wherein a section of at least one of said plurality of elongated torsional springs is a hinge axle for at least one of said plurality of hinges.

12. The expanding panel assembly of claim 1, wherein said section is fixedly attached to said at least one of said plurality of hinges at an end portion of said section.

13. The expanding panel assembly of claim 1, wherein at least one of said plurality of elongated torsional springs further comprises an angled end section attached to an adjoining panel, and wherein the angle of said angled end section with respect to an associated hinge line is approximately 90 degrees.

14. The expanding panel assembly of claim 1, further comprising rotational means attached to two adjacent panels for bringing about a rotational movement about an associated hinge line between said two adjacent panels to move the panel assembly between said first state and said second state.

15. The expanding panel assembly of claim 14, wherein said rotational means comprises a motor attached to the panel assembly and driving one said plurality of elongated torsional springs.

16. The panel assembly of claim 1, wherein said plurality of torsional springs are arranged to simultaneously move all of said plurality of panel from said first state to said second state.

17. A panel assembly having a first state for storage and a second state for deployment, the assembly comprising:

a plurality of rectangular flat panels comprising a first adjoining panel, an inner panel, and a second adjoining panel, said first adjoining panel and said inner panel being connected by a first set of at least two hinges, and said second adjoining panel and said inner panel being connected by a second set of at least two hinges;

a torsional spring element having an inverted U-shape extending across a first face of said inner panel, said torsional spring element being attached at a first end to said first adjoining panel at a first hinge line between said inner panel and said first adjoining panel, and at a second end to said second adjoining panel at a second hinge line between said inner panel and said second adjoining panel, said panel assembly being cooperatively moveable between said first state and said second state, said first state having said first adjacent panel and said second adjacent panel folded upon said first face of said inner panel, and said second state having said plurality of rectangular flat panels situated adjacently in side-by-side fashion.

18. The panel assembly of claim 17, wherein said torsional spring element comprises one of an elongated tube, an elongated rod, and an elongated wire.

* * * * *